Jan. 18, 1927. 1,614,601
G. H. DAVIS
AUTOMATIC UNIVERSAL MOLDING MACHINE
Filed March 19, 1924    4 Sheets-Sheet 4

Inventor
George Howlett Davis
By his Attorneys
Meyers & Cavanagh

Patented Jan. 18, 1927.

1,614,601

UNITED STATES PATENT OFFICE.

GEORGE HOWLETT DAVIS, OF ORANGE, NEW JERSEY.

AUTOMATIC UNIVERSAL MOLDING MACHINE.

Application filed March 19, 1924. Serial No. 700,337.

Our country is upon the threshold of a new era which will become known as "the molding age", toward the development of which all older science ages and present-day arts and industries are contributing at an ever-increasing rate.

Thousands of different articles are now being molded for radio, electrical, telegraph, telephone, automobile, aeroplane, button and other industries in tremendous quantities, and many articles formerly stamped out of metal or formed of wood and other materials are now being molded.

The best chemists in the world are exerting themselves to produce thermo-plastic compounds for molded articles, all of which are more or less meritorious.

Die-makers have excelled themselves in the design and construction of molding dies for various forms of old-style inefficient molding presses.

The principle of this universal molding machine is so broad and flexible as to permit any conceivable combination and degree of heating, cooling, pressing and time units, making it adaptable to the expeditious manufacture of any moldable article out of any known plastic material or compound.

This machine bears the same relation to an ordinary molding press that a universal milling machine bears to a plain miller. The universal adaptability of this new molding machine extends also to the use of complex forms of molds or those having three or more separable parts; and it also meets the special requirements of the new thermo-plastic compositions, particularly synthetic resins, such as phenol-formaldehyde condensation products, etc., all of which demand pre-heating and pre-forming in contradistinction to what are known as shellac compounds, which do not require either pre-heating or pre-forming.

The plastic materials or compositions mostly used for molding may be divided into two classes, viz: (1) thermo-plastic and (2) non-thermo-plastic. Non-thermo-plastics include materials of a comparatively low cost employed for cold pressed articles, the simple requirements of which are easily met by this new machine. The new machine also meets the more complex requirements of thermo-plastic compositions which may be sub-divided into two classes, viz: (1) those which employ shellac and other like substances as a binder and which, in various forms, have been employed for many years; (2) synthetic resin compositions, a knowledge of the general nature and characteristics of which will prove helpful toward an understanding of the functions required to be performed by this universal molding machine in molding compositions like phenol-formaldehyde condensation product.

In the manufacture of phenolic condensation materials it has been usual to produce the same by the combination of phenol and formaldehyde, either with or without a catalyst, acid or base. In some instances at the time of making the initial mixture, such a quantity of formaldehyde is used, that when the resultant plastic is subjected to a predetermined degree of heat, or heat and pressure, as in molding an article, such plastic will assume an infusible form without the use of any additional hardening agent, the quantity of formaldehyde first incorporated in the mass being sufficient for this purpose. Another method of preparing such phenol-formaldehyde condensation products has been to initially mix with the phenol a relatively small quantity of formaldehyde, which of itself is insufficient to cause the product to assume an infusible form at the time of the final molding operation without the use of an additional hardening agent. Therefore, an additional hardening agent, such as formaldehyde or its derivatives, including paraform or hexamethylene-tetramin, is added to the initial mixture of phenol and formaldehyde some time prior to the molding operation, but after the initial mixture of phenol and formaldehyde has undergone chemical combination to a degree to form what might be termed a fusible resin. In other words, one method heretofore employed has been to incorporate the hardening agent after a fusible resin of phenol and formaldehyde has been made. But in every instance, so far as I am aware, formaldehyde or some one of its derivatives has been employed as the hardening agent in the manufacture of these phenolic condensation products, and which for the sake of brevity we will hereinafter designate simply as phenolic compositions.

A phenolic condensation product, possessing points of advantage over known phenol-formaldehyde condensation products, such as above mentioned, may be made by using, as one of the ingredients or elements, furfural—$C_4H_3O.CHO$—(furfuraldehyde), or as a substitute therefor or equivalent thereof, the furfural derivative known as furfuramid—$(C_5H_4O)3.N$.

This new furfural phenolic condensation product reacts with great speed, which is essential to the attainment of economic molding conditions, and therefore requires a little different treatment by our universal molding press from that accorded to other phenolic compositions.

While phenolic compositions harden under the continued application of heat and do not demand any cooling for setting or hardening, yet a slight cooling of the latter, amounting in time to about one-fourth of that required for heating or curing while under pressure, is advisable in most cases.

Phenolic compositions are coming more and more into general use, partly because of their high electrical resistance. Shellac compositions continue to soften under the continued application of heat, and require a relative long time unit for cooling and setting.

The first and perhaps the primary object or advantage attained by this universal molding machine is adaptability to the making of all moldable articles out of any known plastic composition of matter, a few of which have been just described and will be hereinafter more specifically described.

As a second object it entirely obviates the danger and labor connected with manually lifting or handling the molds or dies outside the press, a mechanical conveyor being substituted for the human conveyor.

As a third object it obviates the necessity, particularly in the case of three-part or complex molds, of using a hot press, a cold press and a knocking-block or die-separating press, these functions being all performed by this one machine at a great saving of time, labor and equipment.

The fourth object attained by this new machine is to permit the separating, loading and unloading of one set of molds or dies while a second set is under final pressure, thus assuring rapidity of operation and an increased production.

A fifth object or advantage attained by this machine is to provide an intermittently rotatable conveyor which instantly conveys a set of molds containing the pressed or finished articles to the loading and unloading station, while simultaneously conveying the newly loaded molds to the final pressing station, all this being done automatically.

The sixth object attained by this machine is the obviation of the necessity of extending ejector pins through the heavy base and crossheads of the machine, as well as through the heating and cooling jackets, which objectionable features are exemplified in the patents to C. F. Burroughs, No. 1,308,475, dated July 1, 1919, and No. 1,405,484, dated February 7, 1922.

The seventh object or advantge of this machine over an ordinary molding press is to render accessible for unloading, re-loading and cleaning purposes the several parts of the molds at the loading and unloading station.

The eighth object is to provide powerful means for separating the set of mold parts just conveyed from the main press, and also provide powerful means for pre-forming or pre-pressing the material to be molded before it comes under the main press.

As a ninth object it entirely obviates the danger of cutting off the fingers and hands of operators resulting from the general necessity of having to put the hands between the movable platens of the main press in order to insert or remove material or mold parts.

As a tenth object it reduces to a minimum the movement of the main press ram or plunger, thereby saving considerable time, particularly in a hydraulic press which is relatively slow in its ram movement.

As an eleventh object this universal molding press effects a simultaneous heating or cooling of two sets of molds or dies in any predetermined manner or time units.

A twelfth important object of the invention is to provide an improved method and means for supporting and advancing the plastic material for successive heating and pressing operations, and more particularly for supporting the plastic material in association with forming molds or dies.

A thirteenth important object is to provide for the more effective and uniform heating of the plastic material.

A fourteenth important object is to provide for enclosing the plastic material in mold or die units, and to advance a series of such units past one or more heating or cooling stations and then to position them successively at the pressing station where the problem of properly positioning the articles for pressing, and the devices associated with the main press mechanism, are materially simplified by the association of the molds or dies with the plastic material within the mold units.

A fifteenth important object is to obviate the bending of the dowel pins of the mold units and the consequent injury or destruction of the steel impressions by lifting the mold cope away from its chase in a perfectly straight or vertical line.

This invention is an evolution, extension or refinement of other correlated prior inventions of myself and others, particularly set forth in U. S. Patents No. 1,375,831, dated April 26, 1921; No. 1,401,966, dated January 3, 1922; and No. 1,407,130 dated February 21, 1922, and in my sole inventions covered in applications for U. S. Patents Serial No. 591,857, filed October 2, 1922, relating to art of making disc records, and Serial No. 611,388, filed January 8, 1923 for art of making disc records and similar plastic articles.

Describing the present invention in detail, the machine forming the preferred embodiment thereof comprises the combination and arrangement of parts shown in the accompanying drawings, in which—

The general organization of the machine is similar to that shown in the two above mentioned applications and comprises an assembly of six divisions: (I) a main press; (II) a sub-press, which also acts as a mold or die-separating apparatus; (III) a turntable or rotary conveyor with its actuating devices; (IV) mold or die units detachably mounted in apertures in the turntable; and (V) heating and cooling jackets arranged in the path of travel of the mold units.

The main press (comprising division I), which supports and around which all the other parts and sub-assemblies are built, may be substantially identical with an ordinary or standard hydraulic molding press, a preferred difference being that it has three support or strain rods, instead of four. This main press, being well known in the art, requires no particular description. It comprises the well known form of stand or pedestal 10, supporting a base or bed 11, in which is sunk a hydraulic cylinder 12, into which is fitted a plunger 13, integral with its movable platen 14. To the rear of the base 11 are bolted, in a well-known manner, two support or strain rods 15, and at the front of the base is bolted a pivot and support-rod 16, which is about equal in cross sectional area to the two small rods, 15. Adjustably supported by the rods 15 and 16, is a cross head or abutment 17, having the ears or lugs 18 projecting upwardly therefrom in juxtaposition to the pivot rod or spindle 16.

A sub-press, forming division II, comprises a support or head 19, pivotally secured to the lugs 18, of cross-head 17, and having therethrough a screw 20, passing through its forwardly projecting and overhanging section. A handwheel 21 is secured to the upper end of the screw. A vertically movable platen 22 is pivotally secured to the lower end of the screw. Gripper fingers or latches 23 are secured to rocker shafts 24, and a cooling or heating jacket 25 is secured to the platen, together with the lever and link mechanism 26, 26ª for rocking the shafts 24, to throw the gripper fingers 23 into or out of engagement with the projecting edges 75, of the mold cope 65, all for the several purposes shortly to be described. The weight of the sub-press is nearly counterbalanced by the pull of springs 27, secured to the upper ends of arms 28, formed on support or head 19, and to an angle bar 29, adjustably secured to the tops of the rods 15. The sub-press is so nearly counterbalanced as to require but slight manual force to raise it to the position shown by the dotted lines.

Figures 3, 6:
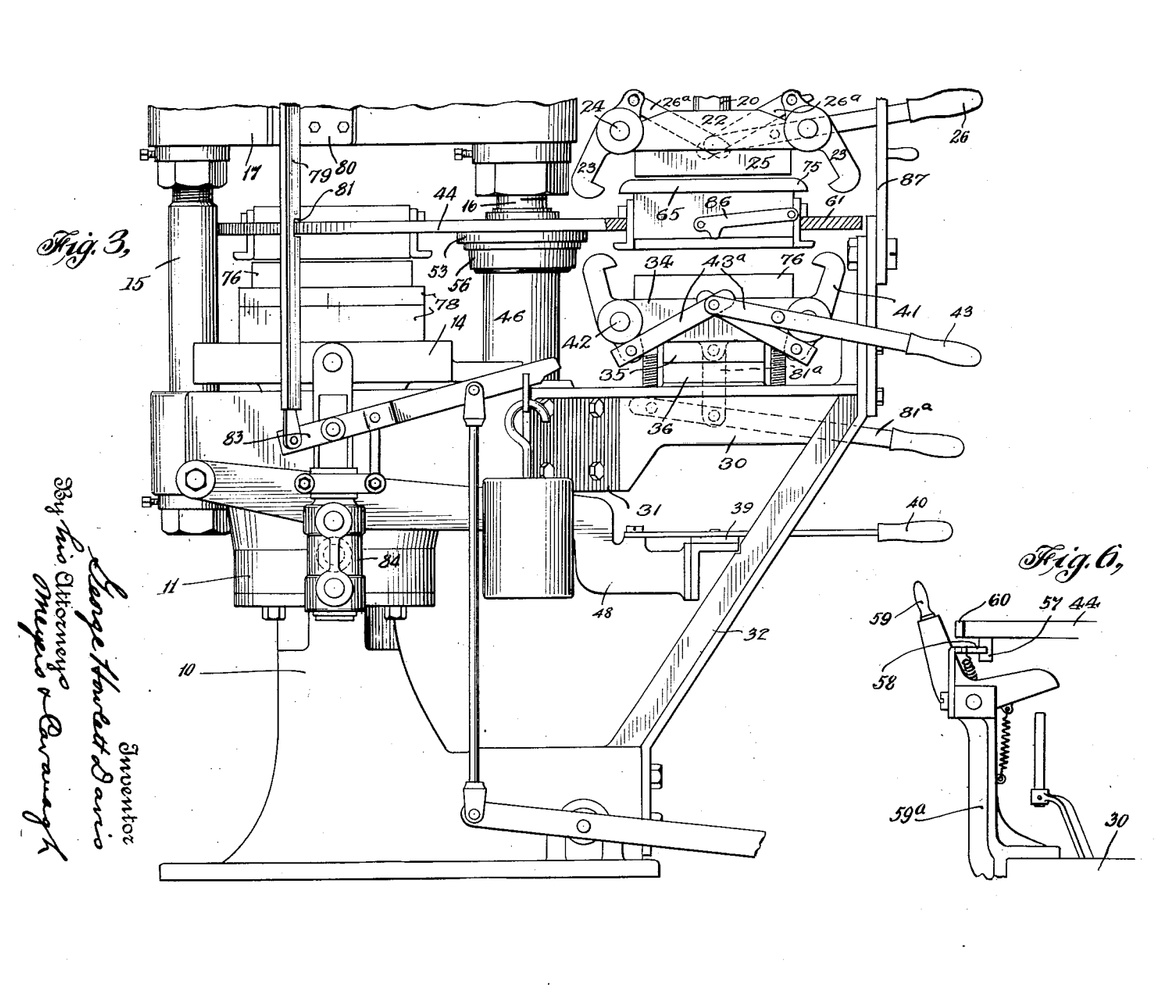
Fig. 3 is a front elevation of a part of the machine.
Fig. 6 is a detail view of the stop-latch device for the turntable.

The lower part of the sub-press is supported by the brackets 30, screwed through their inner flanges 31, to the frame or base 11 of the machine, and supported at their outer ends by the angle-iron brace-bar 32, which latter extends upward to a point near the turntable. A platen 34 is mounted on plungers 33 which reciprocate in suitable apertures in the brackets 30. In certain cases downward movement of the platen is limited by spacer blocks such as 35, 36, resting on the brackets 30. In other cases, as explained later, the platen movement is controlled by a horizontally reciprocable bar 39 carried by brackets on levers 48 which are in turn controlled by the main press plunger movement. Bar 39 has apertures 41 to correspond with the lower ends of the platen supporting plungers 33 and the bars move by a lever 40 fulcrumed at 40ª. When the bar 39 is positioned so that the holes 41 are away from the lower ends of plungers 33, the platen is supported upon or in relation to the bar whenever the bar is elevated, but while so elevated, the platen may be dropped by movement of the lever to position the reciprocating bar 39 so that its holes 41 come below the ends of the plungers whereupon the platen will drop to the extent permitted by the stop and lock nuts 37 and 38, screwed upon the plunger. Two lower rows of gripper fingers 41, are rigidly secured to their rocker shafts 42, and actuated by the hand-lever and link mechanism 43, 43ª, all as clearly shown in Figs. 1 and 3. The platen 34 may at any time after lowering, be raised, by the hand-lever mechanism 81 and links 81ª.

Figure 1:
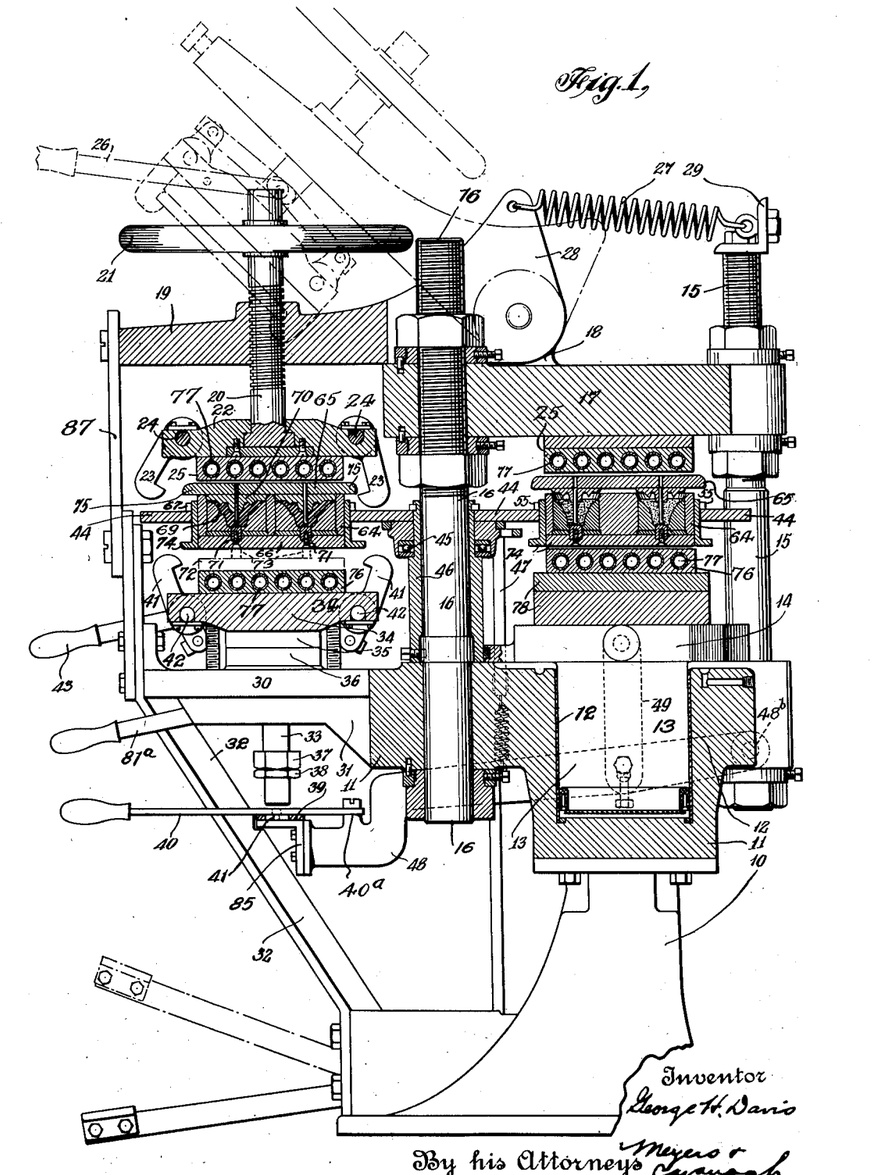
Fig. 1 is a vertical section view of the entire machine in the plane 1—1, Fig. 2.

The centres of the main press and of the sub-press are spaced equi-distant from the pivot rod or spindle 16, and are directly opposite each other in a line running from the front to the rear of the machine and through the centre of the rod, all as clearly shown in Fig. 1.

Figure 2:
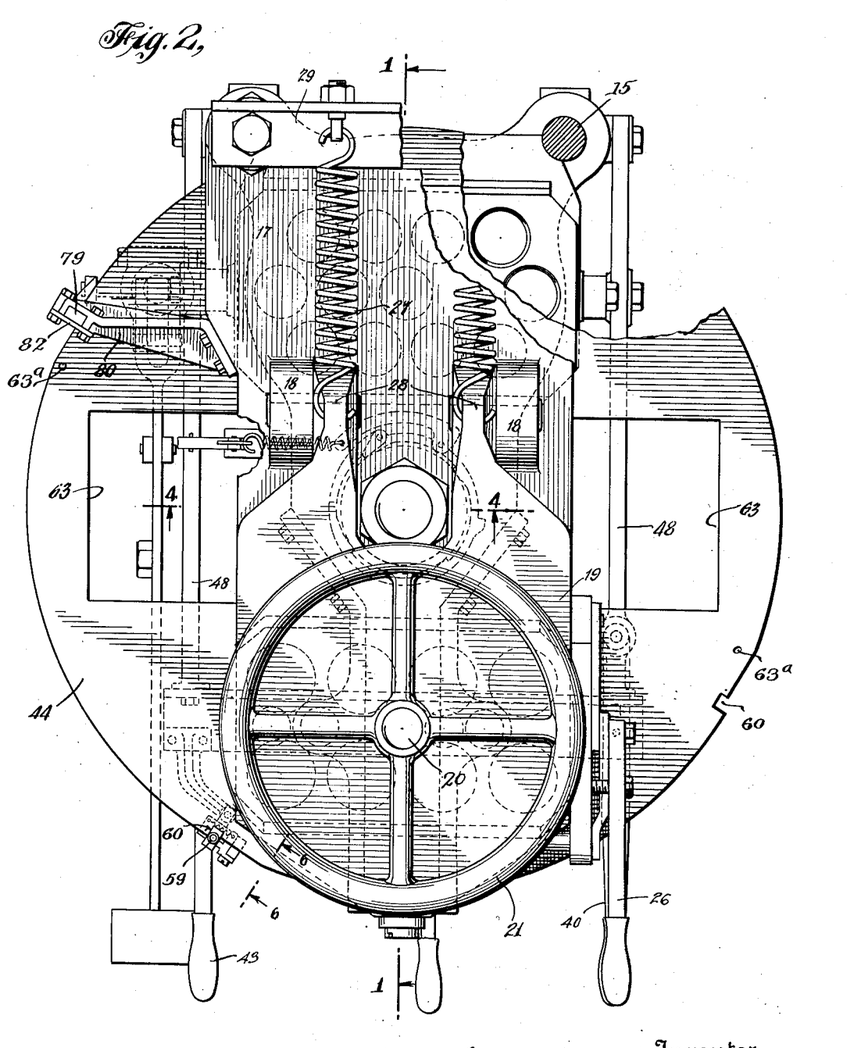
Fig. 2 is a plan view of the machine with several of the upper parts broken away in order to show certain underlying parts.
Figure 4:
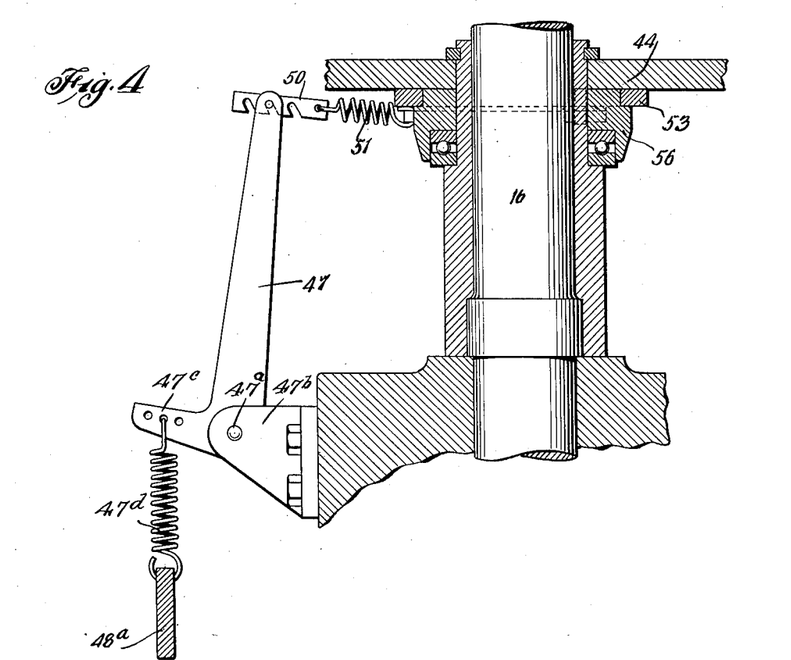
Fig. 4 is a side elevation of a part of the machine as viewed from the left side.
Figure 5:
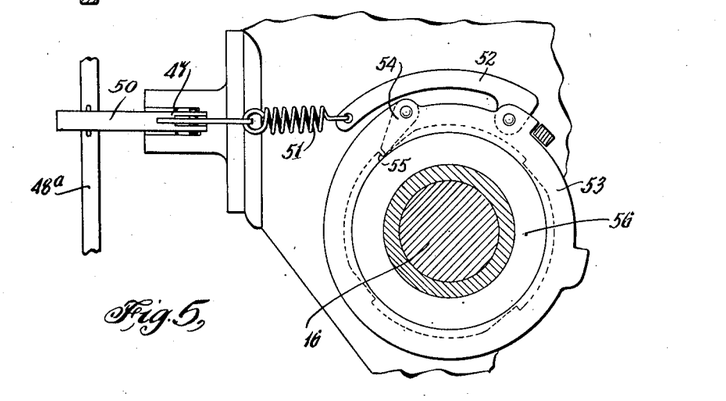
Fig. 5 is a detail view showing the mechanism for revolving the turntable.

Division III of the machine comprises an intermittently rotatable turntable or mold carrier 44, which has for its axis and support the pivot rod 16, and has an anti-friction bearing 45 resting upon the sleeve 46, surrounding said rod 16. The table or carrier, acting as a conveyor, is rotated intermittently in timed relation to the upward movement of the main press plunger, which occurs when the table is in one of its stationary positions. The preferred method of rotating the table or carrier a half-revolution at the proper predetermined time, as required in this particular embodiment of the invention, is through the medium of the bell-crank lever 47, fulcrumed at 47$^a$ in a bracket 47$^b$, Fig. 4. The bell-crank has a short arm 47$^c$ connected by a spring link 47$^d$ to one of the main press lever arms such as 48$^a$. This lever is fulcrumed at 48$^b$ and is connected to the main press plunger head by a link 49. Similarly the companion lever 48 at the opposite side of the main press is fulcrumed at 48$^b$ and connected to the plunger head by a similar link 49. To the upper arm 47 of the bell-crank, is pivotally secured the latch bar 50, the spring 51, and the curved bar 52, the latter in turn being pivotally connected to the ring 53, which latter carries the pawl 54, and oscillates around the rod 16, and causes the pawl to engage the ratchet teeth 55, formed in the annulus 56, secured to the turntable 44, and causes said table or carrier to be freely revolved whenever the main press plunger 13 and its lever arm 48 moves downward. The free ungoverned or overthrow movement of the table or carrier is checked and the table stopped whenever one of the two downwardly projecting pins 57, 57$^a$, Figs. 2 and 6, engage the trip latch 58, causing the latch lever bar 59 to move inward at its upper end and engage one of the notches 60 in the periphery of the table, and stop it suddenly and hold it in its locked position, which is such as to position one of the large rectangular mold apertures 61 directly at the center of the main press and directly over the center of its plunger 13, and the other large rectangular aperture, directly at the center of the sub-press. Whenever it is desired to register the smaller rectangular apertures 63 of the table in operative positions, instead of the larger apertures, it is simply necessary to unscrew and move the pins 57 indicated by the pin sockets 63$^a$, Fig. 2. This method of revolving and stopping the turntable is entirely different from the positive or geared means shown in my two aforementioned applications, and while it lacks positiveness, it has proved effective in practice and saves many expensive parts, including a motor, gears, a friction clutch, etc.

The mold or die units, forming division IV of the machine, are, in the particular instance illustrated, composed of three main members, viz, the chase or body sections 64, the mold copes 65, and the bottom plates 66, this general assembly being known in the trade as a three-part mold, in contradistinction from the more generally used two-part mold formed of only the chase carrying the female impression, and the cope, or cap plate, carrying the male impression. Any ordinary press will operate a single two-part mold by securing its two members, one to a stationary platen and the other to the movable platen of the press, but the more modern articles of manufacture, including such articles as radio-dials, require three-part molds, in which both the upper and lower members must be detached from the body or chase. This machine operates not only one but two such three-part molds, entirely obviating all labor and time of manually lifting or knocking such members apart. The two units of two-part molds, shown in the machine, are of usual design and construction and comprise, as aforesaid, the chase body or central parts 64, having in practice a width of 10½ inches, a length of 18½ inches and a thickness of 3 inches. These are set in the two larger apertures of the turntable and are held loosely in position therein by a plurality of screw pins 67 therein, which rest upon the upper edge of the turntable, allowing the chases to be raised, but not lowered, within their apertures, together with a slight side and lengthwise movement therein, the final alignment of the mold cope 65, and of the bottom plate 66, with the chase 64, being effected by a plurality of dowel pins in a suitable or usual arrangement, extending from the chase through circular openings in the other parts, in a well-known manner. One of the chases 64 has therein eight female cavities for radio dials of four-inch diameter, two of such cavities being shown in cross-section in Fig. 1, while the other chase, shown in the main press, has female cavities for thirteen three-inch radio dials. All the cavities are preferably formed in circular inserts 69, and not directly in the material of the chase, although the latter is occasionally done when hardened multiple cavities are not required. The mold copes 65 have secured thereto by screws, corresponding male "impressions" or dies 70, dowelled into alignment with the female cavities below them, assisted by their own self-aligning configurations. The bottom plates 66, have secured therein the upwardly projecting forming plugs 71. This plate with its plugs must be lowered and removed after the articles have been finally pressed, and a plate 72, with ejector pins 73, substituted at the sub-press when it is time to remove the finished articles. To both sides of each chase are secured angle irons 74, their horizontal portions being adapted to be engaged by the lower series of gripper fingers 41. With the exception of these angle irons the two-part mold units just described may be standard in every respect.

Division V of the machine comprises two pairs of heating and cooling jackets, the upper jackets 25, and the lower jackets 76, of which the two mold units pass and adjacent which the molds are alternately stationed and by which such mold units are either heated or cooled during any predetermined periods, regulated to suit the nature of the article to be made and the nature of the plastic material or compound used. The jackets shown in this machine are rectangular in shape and have a plurality of chambers 77, through which either heating mediums, such as steam or hot water, or cooling mediums, such as cool water or refrigerated air, are caused to pass at will under control of valves in the well-known manner. All four of the chambered jackets may be of the same size and construction, but may be piped differently for different work, as will be hereinafter more fully described. One of the upper jackets 25 is rigidly secured to the under side of the sub-press platen 22, while the other upper jacket 25 is secured to the cross-head 17, which forms the abutment for the main press. One of the lower jackets 76 is rigidly secured to the lower movable platen 34 of the sub-press, while the other lower jacket 76 is rigidly secured to the movable platen 14 of the main press, or rather to the top filler plate 78, superimposed upon the platen 14. Thus, all four platens partake of any movement or adjustment imparted to the parts of the machine to which they are respectively secured.

The only part of the machine remaining to be described is a safety device which prevents the press plunger from rising and bending or otherwise damaging the turntable and other parts of the machine when the proper notch in the turntable is out of registration with the latch bar, and the press plunger is out of registration with the proper aperture in the turntable. This safety device comprises the vertical bar 79, Figs. 2 and 3, slidably supported in the bracket 80, and having the notch 81, on its inner edge. The bar is held slidably by the bracket cap 82. The lower end of bar 79 is pivotally secured to the inner movable part of the lever 83 of a valve 84, in such a manner as to prevent the rear end of said lever 83 from being raised and the hydraulic valve opened unless one of the four notches 60 in the periphery of the turntable is directly in line with the bar, otherwise, the lower edge of its notches 81 will contact with the turntable and prevent the bar 79 and the rear end of the lever 83 from rising, and, consequently, prevent the valve 84 from being opened and power imparted to the plunger through the fluid which provides the hydraulic power. This safety device, while simple and economical in construction, is highly effective in practice.

Having now described the structural features of the preferred form of the machine in detail, I will now describe its modus operandi:

As previously intimated, this machine must be regulated, adjusted and connected in a somewhat different manner for each type of article to be made, and in accordance with the requirements of the compound to be used. We will assume that the compound to be used is phenol-formaldehyde condensation product and the articles to be made are radio dials of two different sizes—4 inches in diameter and 3 inches in diameter—and that the time units for each set of articles are four minutes for heating or curing and one minute for cooling or setting. The time units given have been established in actual practice as suitable in a specific instance. The mold units, shown in Fig. 1, under the sub-press, contain eight 4-inch cavities and the mold units under the main press contain thirteen cavities for 3-inch dials. Under these conditions, it is preferable to connect the chambered jackets, 25, 76 in the sub-press, so that steam will flow therethrough continuously, while the jackets 25 and 76 in the main press are connected to a two-way valve in such a manner as to cause either steam or hot water to flow therethrough alternately at will by the operation of the two-way valve. Fig. 1 illustrates the various parts of the machine in their position directly after a half-cycle of movements and after the plunger 13, has retreated to its lowest position. In this position the material (phenol-formaldehyde condensation product in powdered form) is shown in the main press, partly compressed or preformed, this preforming having been previously done at the sub-press. The 4-inch dials in the molds shown at the sub-press have been finally pressed and are ready for removal from the molds. The valve-operating foot-lever is now allowed to rise to the dotted position shown, assuming that the turntable is in proper registration, when the water under pressure of about 3,000 pounds is caused to flow into the cylinder pot under the plunger 13, and raise the latter until its movement is stopped by the complete compression of the mold-part units above it, effecting the final pressure of the phenol-formaldehyde condensation product powder or briquette within it, and remains closed for a period of approximately three minutes, during the first two minutes of which time steam is caused to flow through the upper and lower jackets 25, 76. During the last minute steam is cut off and water is caused to flow through the same jackets, thus lowering the temperature of the mold parts from about 160° F. to about 90° F., which is sufficient to permanently set the material and condition it to be removed in the shape of finished articles.

During the three minutes consumed in the operation in the main press just described, the following-described movements and operations take place successively at the sub-press: At the moment the plunger 13 of the main press rises, it causes the arms 48 and 48ª to rise simultaneously, these arms being connected at their free ends by an angle iron 85, supporting a slide bar 39, above referred to, upon which rest the two plungers 33, carrying at their tops the platen 34, upon which is rigidly secured the lower steam jacket 75. The upper surface of the latter now engages the bottom of the mold units and raises them until all of the mold units and jackets are compressed together. In this position all the latch fingers 23, 41, are caused to engage the projecting edges 75, of the mold cope 65, and the flanges 74 of the chase when the handwheel 21 at the top of the sub-press is turned contra-clockwise, until the mold cope 65, is raised sufficiently to cause its dowel openings to clear the dowel pins in the chase, when, by a slight effort, the entire upper half of the sub-press, carrying with it the mold cope 65, is raised to the position shown in the dotted lines. In this position the eight cavities in the chase are made accessible and convenient for the removal of their finished contents and for re-filling. The removal of the finished articles is effected by loosening the lower plate 66 of the mold unit by moving a small lever 86 and lowering it until it rests upon the steam jacket below, when it may be slid forward about two inches, until the ejector pins 73 come directly under the opening formerly occupied by the forming plugs 71, which enter idler openings in the chase. The ejector pins, being slightly longer than the forming plugs, contact with the lower surface of the finished dials, when their plate is raised with the entire movable lower part of the press through the upward movement of the hand-lever 81ª, causing the finished articles to be lifted slightly out of their cavities, when they can be easily and quickly removed therefrom. All the operations of the sub-press just described consume about one minute. The next operation is to blow out the eight cavities with a pneumatic blast, after which the cavities are re-filled up to about the upper surface of the chase with carefully weighed or measured material in powdered or briquette form. At or prior to this time the plate carrying the ejector pins is moved back in their normal position, as shown in Fig. 1. The next step in the operation is to lower the upper half of the sub-press and secure it in its lowered position by the large latch bar 87, which is pivotally connected with the lower part of the press in the manner shown. Immediately after this the press is screwed downward with considerable force so as to preform the material within the mold cavities at the same time it is being pre-heated by the upper and lower steam jackets. The sub-press is allowed to remain in this compressing position until the three minutes of curing and setting time allowed at the main press has expired, when all the latches are thrown open and the sub-press is slightly raised to the position shown in Fig. 1. Next the foot-lever controlling the hydraulic valve is immediately depressed, which causes the turntable to be revolved a half turn, and be latched and locked by means of the mechanism previously described in detail. When the foot-lever is allowed to rise again and all operations described are repeated about every three minutes, which constitute the time unit for about a half cycle of the machine, during which period there are alternately delivered either eight four inch dials or thirteen three inch dials. It is taken into consideration that the plastic material is heated at the sub-press for a considerable period before it reaches the main press.

The machine will turn out about twenty 2-inch dials every three minutes in lieu of either the 4-inch or 3-inch dials, which production is about four times greater than that obtained heretofore by one operator, even when employing several machines, such as a hot press, a cold press and a mold separator or arbor press. This universal press will turn out an equivalent quantity of articles requiring a mold unit of nearly the same thickness irrespective of the diameter of the articles, and in this category can be included flanges for music rolls, sockets for electric lamps and radio bulbs, and hundreds of other articles. Thinner articles, irrespective of their diameter, would require thinner chases, in which event the time unit required for their curing would be correspondingly reduced, and for thicker articles the time units would be correspondingly increased. The time units are also affected by the nature of the compounds used, the curing of some phenolic condensation products requiring longer time units than most other phenolic compositions. If a shellac compound is used instead of a longer-curing phenolic condensation product in the various instances above described, the time units for curing and setting would be about equal to one another, and the total time would be about one minute less than that cited for the condensation product.

A more economical method of piping and valving the machine is to allow cool or cold water to flow constantly through the jackets at the sub-press, and steam to flow constantly through the chambered jackets in the main press, which method obviates the expense of valves and the labor of operating the same, but under this method articles are not cooled or set while under maximum pressure and therefore lack in some instances the high finish or polish obtained under the first described method.

Various modes of operation may be adopted, different from those described without avoiding the spirt of this invention; likewise, the structural features of this machine may be varied in numerous ways without avoiding the broad spirit of the invention. A few of such possible variations will be briefly described as follows:

One of the obvious modifications is to gear the screw of the hand-press so as to turn it by power under manual or automatic control, the only objection to this being to add to the expense of the machine and might result in pulling the parts of the die units apart too suddenly, whereas, with the handwheel, an operator can feel for the break-away point and avoid danger.

Another obvious modification would be to substitute an inverted hydraulic cylinder and plunger for the screw at the sub-press, but this construction would also add considerably to the cost of the machine and render it subject to the other objections named above.

All the handlevers shown in the machine may be automatically controlled through any of the well-known forms of timing mechanisms or connected with other movable parts of the machine so as to operate in proper timed relation therewith.

It is also obvious that the plunger or ram of the main press may be raised and lowered by any well-known form of cam or toggle joint mechanism.

All the above briefly mentioned, and other obvious modifications may be made within the broad scope of this invention.

Having described the preferred form of the structural features of the invention in detail and outlined several modifications thereof, and several different modes of operating the machine, what I claim and desire to secure by Letters Patent is:

1. Pressing and molding mechanism of the class described, comprising two presses, power means for operating one of the presses, and means by which the movement of the power operated member of one press moves a member of the other press to an operative position.

2. Pressing and molding mechanism of the class described, comprising two presses, hydraulic pressure means for operating one of the presses, and means also operated from said pressure means for moving or operating the other press.

3. Pressing and molding mechanism of the class described, comprising two presses, one press including a movable element and power means for moving it, and means connected with said movable element to move an element of the other press to an active or pressing position.

4. Pressing and molding mechanism of the class described, comprising two presses, one press including a movable element and a hydraulic ram, and means connected with said ram to move an element of the other press to an active or pressing position.

5. Pressing and molding mechanism of the class described, comprising a framework, a press cylinder located in the framework toward one side thereof, a plunger in the cylinder, a platen on the plunger, a pressing abutment in opposed relation to the platen, supports for the abutment, one of the supports being arranged substantially centrally in the framework, a mold carrier arranged to rotate about said central support, and a sub-press located and supported in the frame at a point substantially opposite the plunger and abutment first mentioned, the last named press including a movable element and a movable support.

6. Pressing and molding mechanism of the class described, comprising a framework, a press cylinder located in the framework toward one side thereof, a plunger in the cylinder, a platen on the plunger, a pressing abutment in opposed relation to the platen, supports for the abutment, one of the supports being arranged substantially centrally in the framework, a mold carrier arranged to rotate about said central support, and a sub-press located and supported in the frame at a point substantially opposite the plunger and abutment first mentioned, and movable mold-engaging and separating elements adjacent the relatively movable elements of the sub-press.

7. Pressing and molding mechanism of the class described, comprising a framework, a main press located in the framework toward one side thereof, a sub-press located in the framework toward the other side thereof, each press including a movable platen and an abutment, supports extending from under parts of the framework and holding the press abutments in opposed relation to the movable press elements, one of said supports being arranged substantially centrally of the framework, and a mold carrier arranged for rotation about said central support and having means for carrying and positioning molds for pressing in the main and sub-presses.

8. Pressing and molding mechanism of the class described, comprising a pressing station and a substantially-opposite loading and unloading station, pressing means at the pressing station, and means at the loading and unloading station for powerfully separating elements of a mold.

9. Pressing and molding mechanism of the class described, comprising a pressing station and a substantially opposite loading and unloading station, pressing means at the pressing station, pressing means at the loading and unloading station, and means at the loading and unloading stations for powerfully separating elements of a mold.

10. Pressing and molding mechanism of the class described, comprising a main press, a sub-press having a tilting head, means for operating the presses in definite relation to each other, and counter-balancing means tending to raise or assist in raising the sub-press head.

11. A mechanism for producing plastic articles, comprising a main press, an apparatus for forcibly separating the mold parts after leaving the main press, and a rotary mold carrier having its axis midway between the main press and the mold separating apparatus.

12. A mechanism for pressing plastic articles, comprising a main press and a sub-press which is also adapted to forcibly separate mold parts and a movable mold carrier common to the presses.

13. Apparatus for producing plastic articles, comprising a carrier, molds or dies for supporting material for the articles, means for separating two or more members of the mold at one station for the purpose of loading and unloading the mold at such station, and means for moving the carrier so as to advance the molds and plastic material therein to a pressing station.

14. Pressure molding mechanism comprising a main press, a sub-press, means for transferring separable molds from one press to the other, and means associated with the sub-press for grasping and powerfully separating mold parts.

15. Pressure molding mechanism comprising a main press, a sub-press including upper and lower platens one of which is removable toward the other, and means associated with at least one of the platens for grasping a mold part for mold separation.

16. Pressure molding mechanism comprising a main press, a sub-press including upper and lower platens one of which is removable toward the other, means associated with at least one of the platens for grasping a mold part for mold separation, and means for moving separable molds from one press to the other.

17. Pressure molding mechanism comprising a main press, a sub-press including upper and lower platens, hand operable means for moving the platens, and means operated by power from the main press for moving the other platen.

18. Pressure molding mechanism comprising a main press, a sub-press including upper and lower platens, hand operable means for moving the platens, means operated by power from the main press for moving the other platen, and movable devices adjacent the platens for engaging parts of separable molds to powerfully separate the mold parts.

19. Pressure molding apparatus comprising a base, an upper abutment spaced from the base, a power operated main press acting between the base and the abutment, and a sub-press substantially opposite the main press, said sub-press comprising a lower platen, an upper platen, one of the platens being movable toward and from the other, a movable support from the upper platen, and means for latching said support in active position for pressing co-operation of the platens.

20. Press mechanism comprising a main press, a sub-press, a mold carrier, and means associated with the sub-press for engaging and separating mold parts.

21. Pressing mechanism comprising a main press, a sub-press including upper and lower heads, and mold engaging means associated with one of the heads.

22. Press mechanism comprising a main press, a movable mold transfer table, a sub-press including upper and lower heads, at least one of them movably mounted, means for moving the movable head, and mold-part engaging means associated with one or both of the heads.

23. Press mechanism comprising a main press, a movable mold transfer table, a sub-press including movably mounted upper and lower heads, means for moving one of them, and mold-part engaging and manipulating means associated with the heads.

24. Pressing mechanism comprising a main press, a sub-press including upper and lower heads, means for lifting the lower head, and means for dropping the lower head.

25. Press mechanism comprising a main press, a sub-press including upper and lower heads, manually operated means for raising and retaining the lower sub-press head in elevated position, and releasing means for lowering the lower head.

26. Press mechanism comprising a main press, a sub-press including lower and upper heads, manually operated means for lifting the lower head, and power operated means for lifting the lower head.

27. Press mechanism comprising a main press, a sub-press including lower and upper heads, manually operated means for lifting the lower head, power operated means for lifting the lower head, and controllable means for rendering said power means ineffective to lift the lower head in certain cases.

28. Press mechanism comprising a main press, a sub-press including upper and lower heads, lower head lifting and retaining means, releasing means for operating said retaining means to cause the head to drop, power means for actuating the lifting means to raise the head, and means intermediate the releasing means and the power means to render the latter ineffective when the releasing means is manually activated.

29. Press mechanism comprising upper and lower heads, power means for moving one of the heads, and mold manipulating devices associated with one of the heads.

30. Press mechanism comprising a main press, a sub-press including upper and lower heads, lower head lifting and retaining means, releasing means for operating said retaining means to cause the head to drop, power means for actuating the lifting means to raise the head, and means intermediate the releasing means and the power means to render the latter ineffective when the releasing means is manually activated, and mold operating means associated with one of the heads.

31. Press mechanism comprising upper and lower heads, power means for moving one of the heads, and mold engaging and manipulating devices associated with the heads.

32. Press mechanism comprising a movable head, manually operable means for lifting and retaining the head in elevated position, and manually operable means for releasing and dropping the head.

33. Press mechanism comprisng a movable head, manually operable means for lifting and retaining the head in elevated position, manually operable means for releasing and dropping the head, and mold manipulating means carried by the head.

34. Press mechanism designed for co-operation with a three-part mold including the chase, a base, and a top or force plate, said mechanism comprising upper and lower heads, means for moving one of the heads, movable means carried by one of the heads to engage and release the force plate and movable means carried by the other head to engage and release the chase.

35. Press mechanism designed for co-operation with a three-part mold including the chase, a base, and a top or force plate, said mechanism comprising upper and lower heads, means for moving one of the heads, movable means carried by one of the heads to engage and release the force plate and movable means carried by the other head to engage and release the base.

36. Press mechanism designed for co-operation with a three-part mold including the chase, a base, and a top or force plate, said mechanism comprising upper and lower heads, means for moving one of the heads, movable means carried by one of the heads to engage and release the force plate and movable means carried by the other head to engage and release the chase and the base.

37. A molding press comprising a central column, a table rotatably mounted thereon and having mold apertures, a main power press at one side of the column, a sub-press at the other side of the column and mold co-operating and separating means associated with the sub-press.

38. A molding press comprising a central column, a table rotatably mounted thereon and having mold apertures, a main power press at one side of the column, a sub-press at the other side of the column, the sub-press comprising upper and lower heads, means for operating one of the heads, power means for operating the other head, and mold engaging and separating means carried by the heads.

39. Molding press mechanism, comprising a main press, a sub-press, and a rotary table for moving molds from one press to the other, the sub-press including upper and lower platens, means for independently raising and lowering the platens, mold part gripping means associated with at least one of the platens and means for moving said gripping means to idle and active positions.

40. Molding press mechanism, comprising a main press, a sub-press, and a rotary table for moving mold from one press to the other, the sub-press including upper and lower platens, means for independently raising and lowering the platens, mold part gripping means associated with at least one of the platens and means for moving said gripping means to idle and active positions, said means for moving one of the platens including power multiplying means admitting application of powerful effort on a mold part to separate said part from another mold part secured to the other platen.

Signed at New York in the county of New York and State of New York this 18th day of March, A. D. 1924.

GEORGE HOWLETT DAVIS.